April 13, 1965 E. RACE 3,177,539
PINTLE WIRES
Filed May 8, 1963

INVENTOR
BY Edward Race
Roberts Cushman Crown
ATTORNEY 3,177,539
PINTLE WIRES
Edward Race, Blackburn, England, assignor to Scapa
 Dryers Limited, Blackburn, England
Filed May 8, 1963, Ser. No. 278,921
9 Claims. (Cl. 24—33)

This invention relates to the pintle or of lacing wires used in mechanical "seams" (commonly known as clipper seams) which are used in belts and other industrial fabrics of a nontubular-woven type, such as, in particular, paper-machine dryer felts, such seams being used for transforming non-tubular woven fabric into an endless belt after it has been installed so as to embrace the pulleys or cylinders and rolls of the machine concerned. Such a seam constitutes a hinge extending transversely of the belt and comprises metal clips or hooks which are inserted side by side into each end of the fabric, or into lengths of webbing stitched to the respective ends of the fabric, and through which, after the hooks or clips on one end of the fabric have been intermeshed with those on the other end, a pintle or lacing wire is inserted to complete the seam.

These pintle wires are subject to a very considerable radial pressure due to the tension in the fabric and they are also subject to a great deal of peripheral friction due to the hinging movement of the clips around them. These two factors result in the wearing of circumferential grooves in the pintle wire, in most cases so deep as to make it impossible to withdraw the wire endwise from the seam, and even in some cases so deep as to cause rupture of the pintle wire. Again, for a perfect seam, said clips should be able to move freely in the axial direction of the pintle wire if and when a belt contracts in width, as may often be the case. The pintle wires cannot be of any great diameter since their diameter is governed by the size of the clips through which they pass, which in turn is governed by the permissive thickness of the seam and this thickness should not greatly exceed the thickness of the felt. As a result of all this the pintle wires are of necessity subjected to a high wear rate and, in too many instances, the service life of a very costly dryer felt is determined by the relatively short life of the pintle wire in its seam, since the rupturing of a seam may result not only in irrepairable damage to the felt, but also to adjacent felts in the machine and even to the machine itself.

Originally, the pintle wires of clipper seams were made of stranded mild steel or Phosphor bronze, and later they were made of stainless steel, but it was found in practice that those metal wires either wore too quickly or were too stiff and caused a rippling in the felt, which rippling was not only a source of damage to the paper being manufactured, but also resulted in rapid wearing of those of the wire clips standing proud at the crests of the ripples. Later, is was proposed to use a stranded metal core protected by nylon coating, the metal in this case being stainless steel or mild steel or Phosphor bronze, but it was found that although the nylon coating had greater wear resistance than the bare stranded metal formerly used, its frictional resistance to the movement of the metal clips over it was so great as to prevent the seam contracting widthwise of the felt when the felt itself contracted. This also set up undesirable rippling in the felt.

It has recently been proposed to make a pintle wire by braiding synthetic yarns of high abrasion resistance on to a stranded metal core and to coat the assembly, with a synthetic resin coating. This wire has been an improvement so far as preventing rippling is concerned but it has the disadvantage that it kinks easily, and even the smallest kink results in a more rapid wearing away at that point.

The wire to be used in clipper seams is supplied to the users in coils. In the uncoiling of the wire for threading a length of it through the intermeshed clips of a seam it frequently happens that a loop or turn of the coil is pulled across the coil and is thereby contracted and, if this contraction goes to the minimum size of loop it sets up a permanent kink in the wire. Similar kinking may occur if the wire happens to be lying on the ground with crossing loops and is stepped on or run over by a truck. Another source of kinking or lumpiness in the wire, in the case of a wire with a stranded metal core, results from unbalance and consequent snarling in the strands of the core. As it is almost impossible to straighten out a kink, at least without removing or damaging the outer braiding or/and resin coating, many wires become useless unnecessarily. Of greater concern is the fact that these kinks are not readily discernible, and the installation of a kinked pintle wire can be disastrous in terms of damaged felts and lost paper production.

Another disadvantage with the said resin-coated braided pintle wires with metal cores is that, when some of the clips on the belt have worn through the coated braid, the rate of wear on the metal core at those points is extremely rapid, which again leads to rupture of the seam. It is apparent, therefore, that disadvantages arise whenever a metal component is incorporated in the pintle wire of a clipper seam.

It is the object of the present invention to provide a form of pintle wire for a clipper seam which has no metal component and is free from the disadvantages of all types hitherto known, in particular that it will not kink if the loops or turns of a coil are pulled transversely of the axis of the coil, that it has a high degree of wear-resistance and has a low co-efficient of friction against metal wire clips, both axially and circumferentially, and that it is not subject to unevenness due to snarling. The improved pintle wires therefore have a much longer useful life than any previously known, and result in a more efficient use of the felts.

A pintle wire according to this invention comprises a central core of a synthetic plastic material which has a high resistance to abrasion, and which has a torsional resilience sufficient to allow it to yield under torsional stress and comprises also a braiding of wear-resistant synthetic material around said core, the braiding having been resin coated after its application to the core. The reference to yielding under torsional stress refers to the fact that if a kink tends to form whilst the wire is pulled in the direction of its length, instead of the stresses at the kink being resisted, as with metal, and eventually causing a permanent set, they cause the material of the core to twist over a distance from each side of the kink and thereby allow the kink to straighten out without permanent set. Synthetic materials suitable for the core of the improved wire are nylon, acrylic resins and polyester resins.

The selected core of the improved pintle wire may be a monofilament or a multi-filament core. When a multi-filament core is used, it may be resin-treated prior to being covered with braid as by coating it with resin as shown at 21b (FIG. 4).

It is conceivable also that with some of the synthetic materials named the core could comprise a yarn or yarns spun from staple fibres instead of being a mono- or multi-filament core.

The invention, in its preferred form, provides a pintle wire for a clipper seam comprising a monofilament nylon core jacketed in a tubular braid consisting of continuous filament yarns of nylon or Terylene (Terylene is a registered trademark) so as completely to be concealed therein and wherein, after braiding, the jacket was resin coated. In some cases there may be two co-axial layers of braiding separately applied, in which case the first layer may or may not be resin coated but the second layer will always be resin coated. The resin may be allowed to soak through the single layer braid and through the inner layer of a two-layer braid, on to the core, so as to bond these components together as a unit, or it may be arranged that, in a double braiding technique only a light coating is applied to the first layer of braid so as to enable this layer to move relatively to the core, a heavier coating being applied to the outer layer.

Suitable resins for use in the coating process are urea-formaldehyde, phenol-formaldehyde, melamine-formaldehyde and epoxy resins. Further alternatives are epoxy-bonded molybdenum di-sulphide and unsaturated polyester resin dissolved in styrene.

The invention will now be described with reference to the accompanying drawing, wherein.

Figure 1:
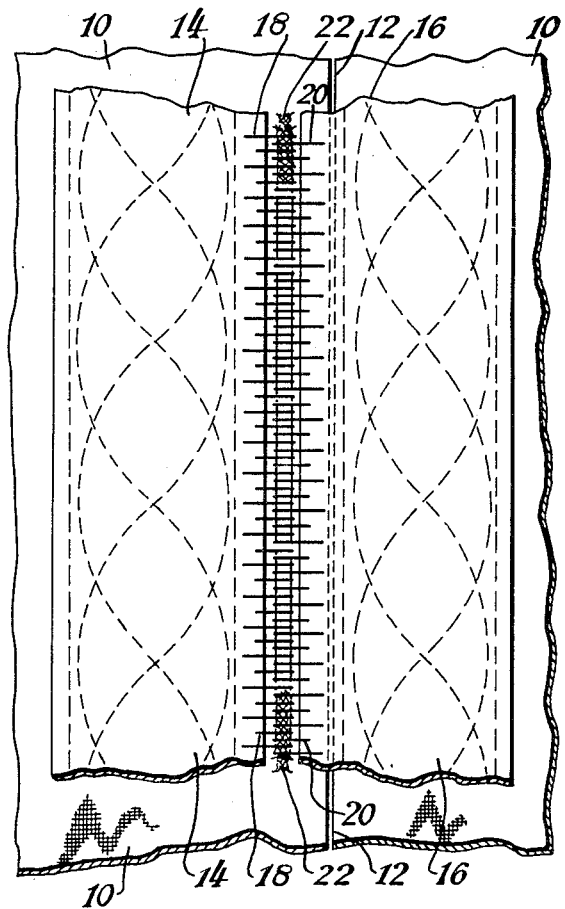
FIG. 1 is a plan of a portion of a clipper seam such as might be found in a paper-machine felt.
Figure 2:
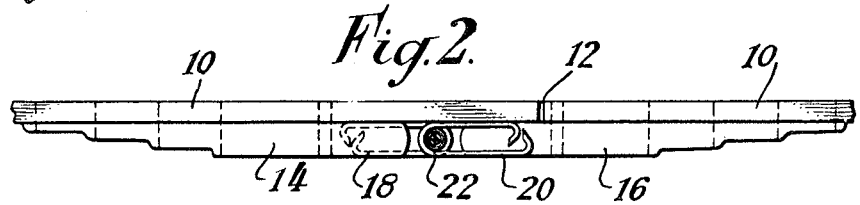
FIG. 2 is an end view of the seam.

As shown in FIGS. 1 and 2 the ends of the non-tubular-woven felt 10 are butted together at 12 after having attached to them the webbing strips 14, 16, which carry the intermeshing wire clips 18, 20. After the relative intermeshing of these clips, a pintle wire, indicated generally as 22 in FIGS. 1 and 2 is threaded through them constituting the seam as a hinge. A representative seam of this character is set forth in United States patent to Hall, No. 2,629,909, dated March 3, 1953.

Figure 3:
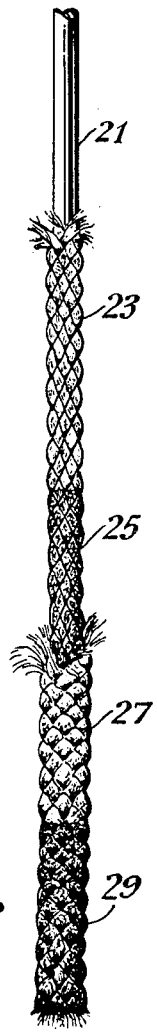
FIG. 3 is a view of one form of the improved pintle wire with some parts removed so as more clearly to illustrate the construction.

Referring now to FIG. 3, the pintle wire is shown in more detail as comprising a solid cylindrical core 21, a first layer of braiding 23 on which is a light resin coating 25, and a second layer of braiding 27 in which is a heavier resin coating 29. The core 21 could be for example nylon monofilament, 0.042" in diameter, with the first braiding 23 of a high-tenacity Terylene multi-filament yarn of 250 denier. The assembly 21–23 has the coating 25 of epoxy-polyamide resin which is subsequently heat-cured. The second braiding layer 27 is also of Terylene and is heat-cured after application of the resin coating 29. The overall diameter of the completed pintle wire was 0.080". Other materials and dimensions may be adopted for other embodiments of the invention, within the scope of the appended claims.

Figure 4:
FIG. 4 is a fragmentary view, similar to FIG. 3, illustrating a modification.

In FIG. 4 a modification is illustrated wherein the core 21x is a multifilament, consisting of or comprising any of the materials suggested as useful in making the monofilament core of FIG. 3.

The improved pintle wires thus provided are durable and non-kinking and are highly wear-resistant. They are within the desirable range of springiness (flexibility coefficient) while the bonded-on braiding and resin coat ensure both a high degree of wear-resistance and a low abrasion of the metal clips as well as a substantially uniform resistance to wear through to the centre.

What we claim is:

1. A cylindrical, non-kinking pintle wire for use in a clipper hinge which joins the ends of a length of non-tubular woven fabric to form an endless papermaker's felt, said wire comprising a cylindrical central core of a synthetic plastic material which has a high resistance to abrasion, said core being flexible transversely of its length and having a torsional resilience sufficient to allow it to yield under a torsional stress which would otherwise cause kinking, and comprising also at least one layer of braiding of wear-resistant synthetic material which embraces and conceals the said core, and a synthetic resin which coats and impregnates the braiding.

2. A pintle wire according to claim 1, in which the material of the core is selected from the group consisting of nylon, acrylic resin and polyester resin.

3. A pintle wire according to claim 1, in which the synthetic core is a monofilament selected from the group consisting of nylon, acrylic resin and polyester resin.

4. A pintle wire according to claim 1, in which the synthetic core is a multifilament selected from the group consisting of nylon, acrylic resin and polyester resin.

5. A pintle wire according to claim 1, in which the synthetic core is a multifilament selected from the group consisting of nylon, acrylic resin and polyester resin and a coating of synthetic resin covering said core within said layer of braiding.

6. A pintle wire for a clipper seam, comprising a central cylindrical core of a synthetic plastic material which has a high resistance to abrasion, said core being flexible transversely of its length and having a high torsional resilience sufficient to allow it to yield under a torsional stress which would otherwise cause kinking, and comprising also a first layer of braid of wear-resistant synthetic material covering said core, a resin coating on said first layer, a second layer of braid of wear-resistant synthetic material overlying said resin coating and a second resin coating on the outer surface of said second layer of braid.

7. A pintle wire according to claim 6, in which the resin coating on the said first braid layer so penetrates the braid as to bond the braid and the core together as a unit.

8. A pintle wire according to claim 6, in which the resin coating on the first layer of braid is such as to leave the braid free to move relatively to the core.

9. A pintle wire according to claim 1, further characterized in that the synthetic resin which constitutes the coating of the braid is selected from the group consisting of epoxy polyamide mixtures, urea-formaldehyde, phenol-formaldehyde, epoxy resins, melamine formaldehyde, epoxy-bonded molybdenum di-sulphide and unsaturated polyester resin dissolved in styrene.

References Cited by the Examiner

UNITED STATES PATENTS

| | | | |
|---|---|---|---|
| 2,077,891 | 4/37 | Milnes | 24—33 |
| 2,146,275 | 2/39 | Thompson | 87—1 |
| 2,629,909 | 3/53 | Hall | 24—33 |
| 2,712,263 | 7/55 | Crandall | 87—1 |
| 2,824,485 | 2/58 | Gregory | 87—1 |
| 2,945,412 | 7/60 | Johnson | 87—1 |
| 2,968,829 | 1/61 | Meddick | 16—168 |
| 2,985,056 | 5/61 | Greve | 87—6 |
| 2,987,332 | 6/61 | Bonmartini | 16—168 |
| 3,048,078 | 8/62 | Kaplan | 87—1 |

DONLEY J. STOCKING, *Primary Examiner.*